Aug. 24, 1965  R. O. RAGAN ETAL  3,201,871
APPARATUS FOR MEASURING THE HYGROEXPANSIVITY
OF PAPER AND PAPERBOARD
Filed Sept. 25, 1961  2 Sheets-Sheet 1
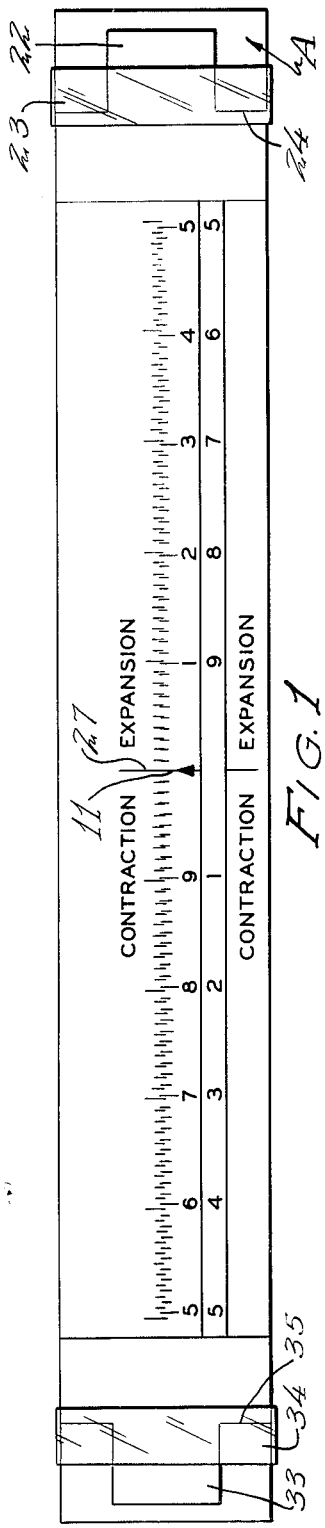
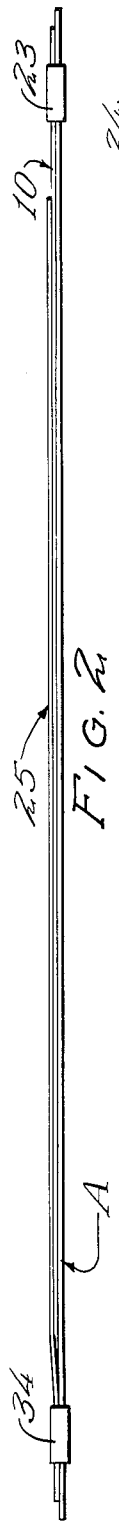
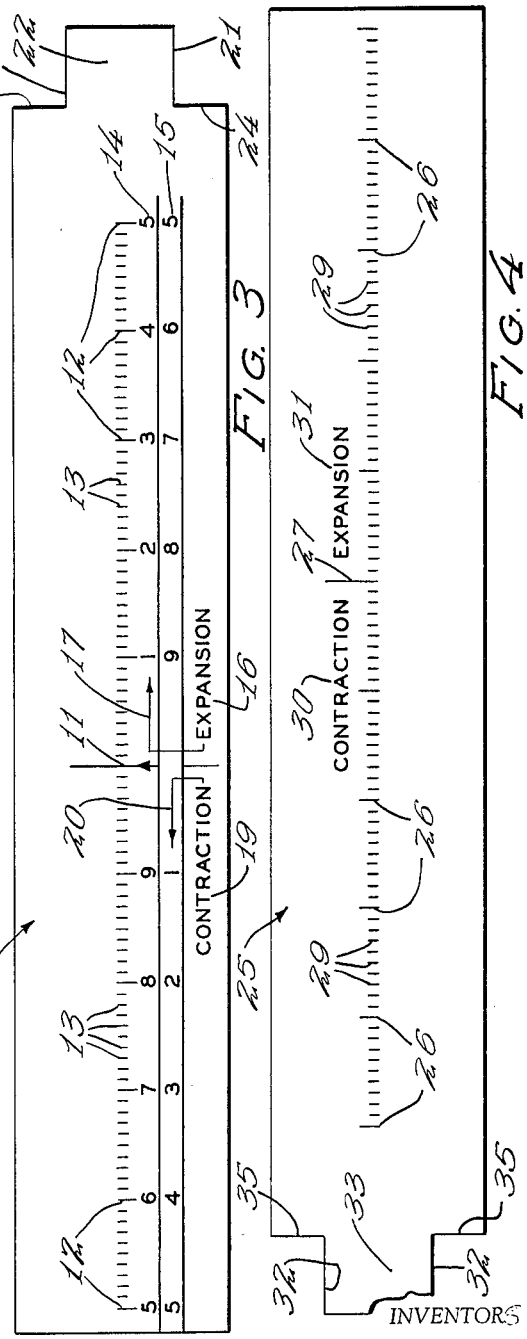
INVENTORS
ROBERT O. RAGAN
MILES A. SNYDER
BY
ATTORNEY INVENTORS
ROBERT O. RAGAN
MILES A. SNYDER
BY *Robert M. Dunning*
ATTORNEY United States Patent Office 3,201,871
Patented Aug. 24, 1965

3,201,871
APPARATUS FOR MEASURING THE HYGRO-EXPANSIVITY OF PAPER AND PAPERBOARD
Robert O. Ragan, Oak Park, and Miles A. Snyder, Western Springs, Ill., assignors, by mesne assignments, to Waldorf Paper Products Company, St. Paul, Minn., a corporation of Minnesota
Filed Sept. 25, 1961, Ser. No. 140,471
3 Claims. (Cl. 33—125)

This invention relates to an improvement in a method and apparatus for measuring the hygroexpansivity of paper and paperboard and deals particularly with a method which can accurately measure expansion and contraction to changes of one thousandth of an inch while the samples are either under tension or are free.

Many devices have been produced for measuring the hygroexpansivity of paperboard. Most of the methods now available are cumbersome, tedious to perform, and often require costly apparatus. For example, in one such device, the sample strips of the material to be tested are clamped and the dimensional changes are measured by special micrometers attached to each sample. Other methods have also been produced, but in general, all such procedures now depend upon "yardstick" measuring between scribe marks, upon the reference of a pointer to a scribe line, or the adaptation of special micrometers. These methods all lack accuracy, versatility, or reproducability. Accordingly, a satisfactory method of accomplishing this result is much needed by the industry.

An object of the present invention lies in the provision of two scales, one of which comprises a vernier scale and the other of which comprises an actual scale. These scales are made of a material which will not change in dimension upon changes in humidity. The scales are secured in adjacent relationship upon the strip of paperboard by securing one end of the vernier scale to one end of the test strip, and securing the opposite end of the other scale to the opposite end of the test strip. The scales are positioned so that certain zero points or reference points are in coinciding relation. As the test strip expands or contracts, the scales slide in one direction or the other, and accurate measurements of the amount of expansion and contraction may be obtained. The changes in dimension can be read directly at the point where the vernier marks coincide with the marks on the actual scale.

A feature of the present invention resides in the provision of a device of the type described which may be attached to the ends of the test strip quickly and easily through the use of pressure sensitive tape or by other suitable means. One of the scales is secured to one end of the strip to extend longitudinally thereof. The other scale is secured to the other end of the strip to extend in adjacent relation to the first scale. The second scale is arranged with its zero marking in coinciding relation to the zero marking of the first attached scale. The second scale is then secured to the strip so that expansion or contraction of the test strip will cause a relative sliding movement between the two scales so that an extremely accurate measurement of dimensional changes may be obtained.

A further feature of the present invention resides in the fact that the scales may either be thin metal strips with the scale marks on adjoining longitudinal edges so that the two scales when in place are in side by side relation. However, in preferred form, the scales are formed on dimensionally stable polyester base film with one scale overlying the other. The film is transparent so that the relationship of the gauge marks of both scales may be noted at any time.

A further feature of the present invention resides in the fact that the apparatus can be used equally well on paperboard of considerable thickness, and also on light weight papers and films which are not normally sufficiently rigid to normally remain flat during the testing procedure. In such a case, the test strip is anchored to the ends of a strip of spring metal, the ends of the strip holding the spring in bowed form. As a result, the test strip is held under slight tension, and the cooperable scales are secured to opposite ends of the test strip much in the manner described.

These and other objects and novel features of the present invention will be more clearly and fully set forth in the following specification and claims.

In the drawings forming a part of the specification:

FIGURE 1 is a top plan view of a test strip having a true dimension scale secured to one end of the strip and having a vernier scale secured to the opposite end thereof. The scales are formed on dimensionally stable polyester base film which is transparent, and the scales are arranged in superimposed relation.

FIGURE 2 is a side elevational view of the test strip and scales illustrated in FIGURE 1.

FIGURE 3 is a plan view of the true length scale, showing the general arrangement thereof.

FIGURE 4 is a top plan view of the vernier scale which is used in conjunction with the true length scale of FIGURE 3.

Figure 5:
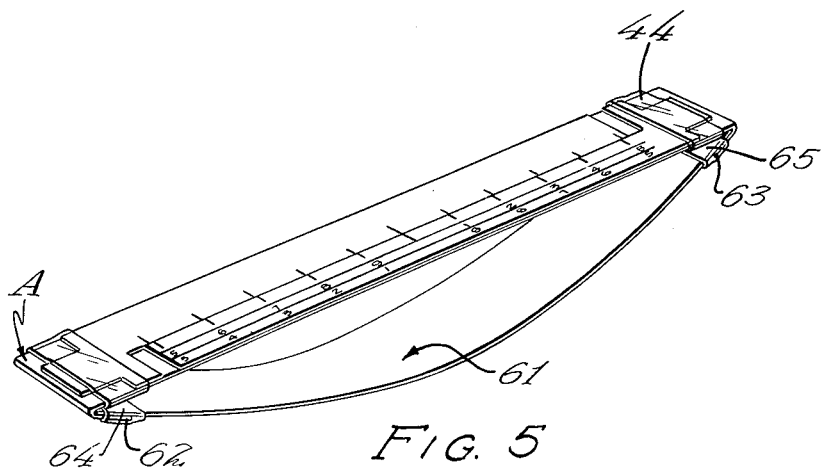
FIGURE 5 is a perspective view showing a slightly modified form of scale construction, and in which the test strip is secured to the ends of a bowed spring strip.

The actual size and length of the scales may be varied, and obviously a long scale can be read somewhat more accurately than a shorter one. However, for the purpose of convenience, the true length scale which is indicated in general by the numeral 10 has a section which is ten inches in length with a zero mark or reference arrow 11 at the center of the scale. The true length scale is divided by gauge marks such as 12 which are located one inch apart, and the space between the gauge marks 12 is divided into tenths by intermediate gauge marks 13 between the inch gauge marks 12. For the purpose of convenience in reading the true length scale 10, a first row of indicia 14 is provided which is used for measuring the expansion of the test strip. From the zero mark 11, the inch marks 12 to the right of the zero mark are successively marked with the numerals 1, 2, 3, 4, and 5. To the left of the zero mark 11 and reading to the right from the left hand end of the scale, the inch marks 12 are identified by the numerals 5, 6, 7, 8, and 9.

The scale 10 is also identified by a second row of indicia 15 which is designed to provide a measurement of the contraction of the test strip. The inch marks 12 to the right of the center mark 11, and reading from the right hand end of the scale, are successively indicated by the numerals 5, 6, 7, 8 and 9. To the left of the center or zero mark 11, and reading from the center toward the left hand end of the scale, the inch marks 12 are successively designated by the numerals 1, 2, 3, 4 and 5.

As is also evident from an examination of FIGURE 3, the row of indicia 14 is identified by the word "expansion" indicated at 16, and including an arrow 17 which indicates to which row the word applies. The word "contraction" is indicated at 19 with an arrow 20 designed to show that the word 19 relates to the row 15 of indicia. In actual practice, the words 16 and 19 may appear incorporated directly in the rows 14 and 15, and the arrows 17 and 20 may be omitted.

In order to simplify the attachment of the scale 10 to the test strip which is merely an elongated strip of the material to be tested, the end corners at the right hand end of the scale 10 are notched as indicated at 21, so that the right end of the scale is provided with a projecting tab which is of perhaps one-half the total width of the scale. The strip to be tested is normally cut to the same width as the scale 10, and the right hand end of the test strip A is attached to the scale 10 by suitable means, such as by a strip 23 of pressure sensitive tape which extends across the tab 22 and which preferably overlies a portion of the end of the full width portion of the scale. As a result, the tape strip 23 securely holds the scale in proper alignment with the test strip, and prevents relative movement of the scale either longitudinally of the test strip or transversely thereof. In the particular arrangement illustrated, the end edge 24 of the full width portion of the scale 10 is at a distance of one inch from the right hand inch marker 12.

The vernier scale 25 is constructed as is best indicated in FIGURE 4 of the drawings. The total length of the marked portion of the scale 25 is ten and one tenth inches, or one tenth of an inch longer than the true scale. The marked portion of the scale is divided into ten sections by the equally spaced gauge marks 26 which are equally spaced on opposite sides of a center or zero mark 27 which acts as a reference point. The ten sections formed by the gauge marks 26 are each divided into ten smaller equal divisions by the intermediate gauge marks 29. Thus both of the scales 10 and 25 are divided into one hundred sections of equal length, the sections of the true length scale 10 being spaced apart a distance of one tenth of an inch, while the sections between the gauge marks 29 are spaced apart a distance of .101 inch apart. As a result, changes in dimensions of the test strip may be accurately read to one thousandth of an inch.

The word "contraction" is indicated at 30 as appearing on the left hand side of the center mark 27, and the word "expansion" is indicated at 31 on the right hand side of the center line 27. When the test strip expands, and the two scales are in superimposed relation, the zero reference arrow 11 of the scale 10 will appear to the right of the zero reference mark 27 of the scale 25; while if the test strip contracts, the zero reference arrow 11 will appear to the left of the zero reference mark 27 of the scale 25.

As in the case of the row 10, an end of the scale 25 is notched to permit the scale to be more readily anchored to the test strip. The left hand end of the scale 25 is notched as indicated at 32 so as to provide a central projecting tongue 33 which is about one-half the total width of the scale 25. This enables the scale 25 to be attached to the test strip A by means of a strip 34 of pressure sensitive adhesive which preferably extends across the tongue 33 and also extends partially across the full width portion of the scale.

The outer edge 35 of the full width portion of the scale 25 is at a distance of six inches from the center mark 27 of the scale, so that when the two scales 10 and 25 are placed in superimposed relation as indicated in FIGURE 1 of the drawings, and the zero reference arrow 11 of the scale 10 coincides with the center mark 27 of the scale 25, as indicated in FIGURE 1, the end edges 24 and 35 of the two scales are 12 inches apart. Obviously, however, this arrangement is a matter of choice rather than of necessity. In having the vernier scale 25 longer than the actual scale, the indicating pointer or zero mark 11 is on the bottom scale and expansion of the test strip moves the arrow 11 to the right relative to the vernier scale 25. If desired, the vernier scale 25 could be shorter than the actual scale and similar results would be obtained. In such a case, the arrow pointer would be on the top scale or vernier scale 25 and would correspond with the zero mark on the actual scale. Upon expansion of the test strip, the arrow would then move to the left on the actual scale, rather than to the right.

In the use of the apparatus, a strip of paper or board is cut two inches wide and approximately 15 inches long (as a typical example with the particular device which has been described). The scale 10 is placed to overlie the strip A and is secured in position in a suitable manner, such as by the pressure sensitive tape 23. Polyester tape may be used so that no dimensional change may be experienced.

The scale 25 is placed to overlie the scale 10, and the zero mark 27 is exactly aligned with the reference pointer 11. The scale 25 is then secured in place to the test strip in any suitable manner, such as with the pressure sensitive tape 34.

The sample with the scales secured thereto is then subjected to the desired environment of high or low humidity. The test strip A may be hung up at one end, or placed on a flat surface as preferred.

The dimensional change is ready by first noticing whether or not the arrow pointer 11 on the scale 10 is on the expansion side or the contraction side of the zero mark 27. If the arrow is on the expansion side, the gauge marks on the two scales are examined to determine where the fine lines coincide. The numbers appearing in the scale or row of indicia 14 indicate 0.1 inch, and the fine divisions 13 between the numbered marks 12 indicate .001 inch. If an expansion greater than .05 inch is experienced, the scale resumes on the left side of center. As a result, the expansion can be determined to one thousandths of an inch.

If, on observing the scales, the pointer 11 appears to the left of the zero line 27 on scale 25, the test strip has contracted and a similar procedure is followed reading on the scale or row of indicia 15. The point where one of the gauge marks on scale 10 coincides with a gauge mark on the cooperable scale is noted, the amount of contraction is read from scale 15.

In the event the arrow 11 moves past the first small division adjacent the zero mark 27, the expansion or contraction will be .1 inch plus whatever is shown by the vernier lines.

In the FIGURES 5–8 of the drawings, a modified form of construction is illustrated. The main feature of difference lies in the fact that the true length scale 40 and the vernier scale 41 need not be formed of transparent material as the scales are arranged to slide in side by side relation. As a result, the scales may be made of aluminum or similar material, and the gauge marks are provided along the adjacent edges of the two scales.

The scale 40 is shown as including an end portion 42 which is of the full width of the test strip A for convenience in properly locating the scale. As in the previous described construction, the scale 40 is provided with a central tongue 43 projecting beyond the end 42. The centrally located tongue 43 permits the scale 40 to be attached to the test strip by pressure sensitive tape such as 44, in the manner which was described in conjunction with the earlier modification.

The scale 40 is somewhat more than 10 inches in length, and includes a series of divisions 45 which are located one inch apart. The space between the gauge marks 45 is divided into ten equal spaces by the fine gauge lines 46. A first scale 47 similar to the scale 14 comprises an expansion scale, and a second scale 49 similar to the scale 15 comprises a contraction scale. The gauge marks 45 and 46 are along the edge 50 of the scale 40 which, in practice, will extend substantially along the center line of the test strip A.

The scale 41 is also provided with an end portion 51 which is of the full width of the test strip to assist in locating the scale on the strip. A projecting tongue 52 extends from the end portion 51 and is somewhat narrower than the end portion 51 to assist in securing the scale to the test strip. The main portion 53 of the scale 41, similar to the main body portion 54 of the scale 40 is of a width substantially one-half the width of the test strip. As a result, the edge 55 of the scale 41 may extend substantially along the center line of the test strip when the two scales are in place.

The main body portion 53 of the scale 41 is of approximately of the same length as the body portion 54 of the scale 40, and the edge 55 is provided with gauge marks extending through a length of ten and one-tenth inches. This length of the edge is divided into ten equal sections by gauge marks 56 which in actual practice are 1.01 inches part. The spaces between the gauge marks 56 are subdivided into ten sections of equal length by fine gauge lines 57. A zero line or reference line 59 is provided at the center of the scale, and a reference pointer 60 is provided at the center of the scale 40.

Figure 6:
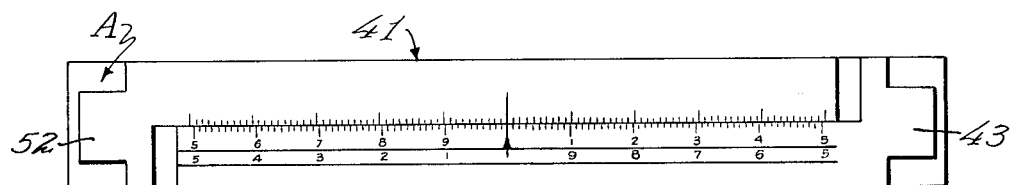
FIGURE 6 is a plan view of the combined scales shown in FIGURE 5.
Figure 7:
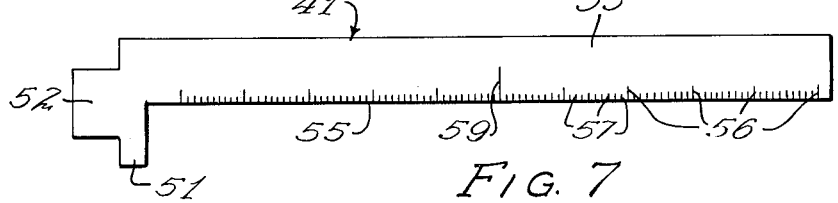
FIGURE 7 is a top plan view of the vernier scale used in the combination indicated in FIGURE 6.
Figure 8:
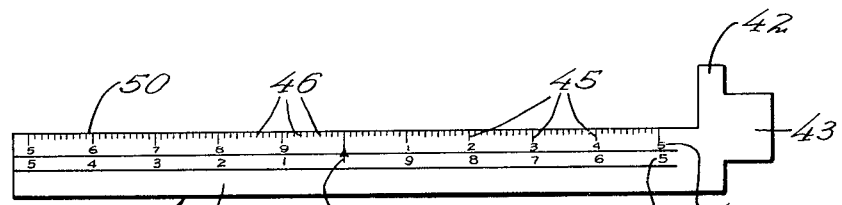
FIGURE 8 is a top plan view of the true length scale used in the construction illustrated in FIGURE 6.

The two scales 40 and 41 are secured to the surface of the test strip to lie in side by side relation as indicated in FIGURES 5 and 6 of the drawings, the zero line 59 of the scale 41 coinciding with the arrow 60 on the scale 40 at the time of attachment. Variations in expansion can be read on the scale 47 while variations in contraction may be read upon the scale 49.

Where the test strip which is employed is of paper or light weight material, the strip A may be held taut by anchoring the ends of the test strip to a strip of spring metal indicated at 61. In order to hold the various strips being tested under a uniform tension, the ends 62 and 63 are folded around the ends of the spring strip 61, and are anchored thereto by strips of tape such as 64 and 65, the spring strip being flexed until there is a distance of two inches between the center of the spring strip and the center of the test strip. Obviously the spring strip may be flexed to a greater or lesser extent, but uniform results are obtained only by maintaining the amount of bow substantially equal in all cases.

In accordance with the Patent Statutes, we have described the principles of construction and operation of our improvement in a method and apparatus for measuring the hygroexpansivity of paper and paperboard, and while we have endeavored to set forth the best embodiment thereof, we desire to have it understood that changes may be made within the scope of the following claims without departing from the spirit of our invention.

We claim:

1. An apparatus for measuring the hygroexpansivity of a test strip of material capable of expanding and contracting in length upon variations in moisture therein, the device including:
    a flat elongated strip of spring material,
    means for securing the ends of said test strip of material to the ends of said spring strip in a manner to bow the spring strip into curved form with the test strip of material stretched between the ends of the spring strip bridging the bow of the spring strip,
    an actual scale and a vernier scale,
    means for connecting the actual scale in face contact to one end of said test strip of material,
    means for connecting the vernier scale to the other end of said test strip of material,
    said scales being in predetermined relation, whereby expansion or contraction of said test strip of material will vary the relative positions of said scales.

2. The structure of claim 1 and in which at least one of said scales is made of transparent material and overlies the other scale in face contact thereto, said other scale being visible through said one scale.

3. An apparatus for measuring the hygroexpansivity of a test strip of material capable of expanding and contracting in length upon variations in moisture therein the device including:
    a flat rectangular strip of spring material having parallel end edges,
    means for securing the ends of said test strip overlying end portions of the convex side of said spring strip when said spring strip is bowed into curved form with the intermediate portion of the test strip stretched across the concave side of the spring strip and over said parallel end edges of said spring strip,
    an actual scale and a vernier scale,
    means for connecting the actlual scale to one end of the intermediate portion of the test strip in face contact thereto,
    means for connecting the vernier scale to the other end of the intermediate portion of the test strip,
    said scales being in predetermined relation, whereby expansion and contraction of the test strip will vary the relative positions of said scales.

References Cited by the Examiner

UNITED STATES PATENTS

| | | | |
|---|---|---|---|
| 285,661 | 9/83 | Paine | 33—147 |
| 1,572,193 | 2/26 | Engel | 33—179 |
| 1,672,913 | 6/28 | Schaap | 33—179 |
| 1,759,219 | 5/30 | Bowlus. | |
| 1,773,114 | 8/30 | Mueller | 33—148 |
| 2,047,276 | 7/36 | Lyman et al. | 33—111 X |
| 2,564,991 | 8/51 | Paul. | |
| 2,666,262 | 1/54 | Ruge | 33—148 |
| 2,742,705 | 4/56 | Gelardi | 33—125 X |
| 2,787,834 | 4/57 | Shoup | 33—147 |
| 3,060,584 | 10/62 | Westfall | 33—111 X |

LEO SMILOW, *Primary Examiner.*

ISAAC LISANN, *Examiner.*